United States Patent [19]

Vercellotti et al.

[11] Patent Number: 5,317,309
[45] Date of Patent: May 31, 1994

[54] DUAL MODE ELECTRONIC IDENTIFICATION SYSTEM

[75] Inventors: Leonard C. Vercellotti, Oakmont; Alan F. Mandel, Mt. Lebanon; Richard J. Ravas, Penn Twp., Westmoreland County; John C. Schlotterer, Murrysville; James A. Neuner, Richland Township, Allegheny County, all of Pa.

[73] Assignee: Westinghouse Electric Corp., Pittsburgh, Pa.

[21] Appl. No.: 948,345

[22] Filed: Sep. 21, 1992

Related U.S. Application Data

[63] Continuation of Ser. No. 609,983, Nov. 6, 1990, abandoned.

[51] Int. Cl.$^5$ ........................ G08C 19/00; G01S 1/00
[52] U.S. Cl. ........................ 340/825.54; 340/825.34;
340/825.49; 340/825.69; 340/825.72; 340/568;
340/573; 342/386; 235/380; 455/343
[58] Field of Search ............ 340/825.54, 825.49,
340/825.32, 825.34, 825.31, 568, 573, 539,
825.69, 825.72; 342/44, 386, 450, 463; 367/117;
455/38.3, 343, 127; 235/380, 491

[56] References Cited

U.S. PATENT DOCUMENTS

| | | |
|---|---|---|
| 3,439,320 | 4/1969 | Ward . |
| 3,755,781 | 8/1973 | Haas et al. . |
| 3,755,782 | 8/1973 | Haas et al. . |
| 3,859,624 | 1/1975 | Kriofsky et al. . |
| 3,898,619 | 8/1975 | Carsten et al. .................. 340/825.54 |
| 4,225,953 | 9/1980 | Simon et al. ........................ 367/117 |
| 4,384,288 | 5/1983 | Walton .......................... 340/825.34 |
| 4,471,345 | 9/1984 | Barrett, Jr. ..................... 340/825.32 |
| 4,495,496 | 1/1985 | Miller, III ...................... 340/825.34 |
| 4,514,731 | 4/1985 | Falck et al. ..................... 340/825.34 |
| 4,533,871 | 8/1985 | Boetzkes ........................ 324/825.54 |
| 4,598,272 | 7/1986 | Cox .................................. 340/539 |
| 4,598,275 | 7/1986 | Ross et al. ..................... 340/825.31 |
| 4,604,618 | 8/1986 | Akiba et al. .................... 340/825.06 |
| 4,656,463 | 4/1987 | Anders et al. .................. 340/825.54 |
| 4,667,193 | 5/1987 | Cotie et al. ..................... 340/825.54 |
| 4,688,026 | 8/1987 | Scribner et al. .................. 340/572 |
| 4,691,202 | 9/1987 | Denne et al. ................... 340/825.54 |
| 4,742,335 | 5/1988 | Vogt ............................. 340/825.06 |
| 4,814,742 | 3/1989 | Morita et al. .................. 340/825.54 |
| 4,814,751 | 3/1989 | Hawkins et al. .................. 340/573 |
| 4,837,568 | 6/1989 | Snaper .......................... 340/825.54 |

Primary Examiner—John K. Peng
Assistant Examiner—Andrew Hill
Attorney, Agent, or Firm—G. R. Jarosik

[57] ABSTRACT

A dual mode electronic identification system using a tag which has a RF receiver and transmitter contained therein. In the first mode the tag responds to an interrogation signal by transmitting identification data to the interrogator. In the second mode the tag periodically transmits an identification beacon signal to a directional sensing antenna which uses the signal to compute the position of the tag. The power supply for the tag operates from an internal battery or from power received from a portal signal via a tag receiving antenna. The battery can be automatically turned off when the tag is in the portal area and the unit can be shifted into the battery operated beacon mode when the tag is removed from the portal area.

20 Claims, 2 Drawing Sheets

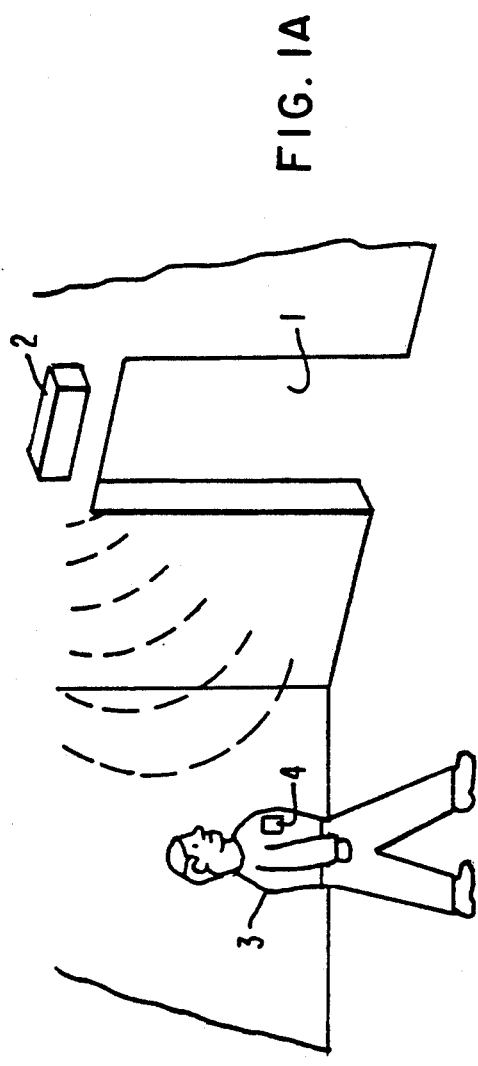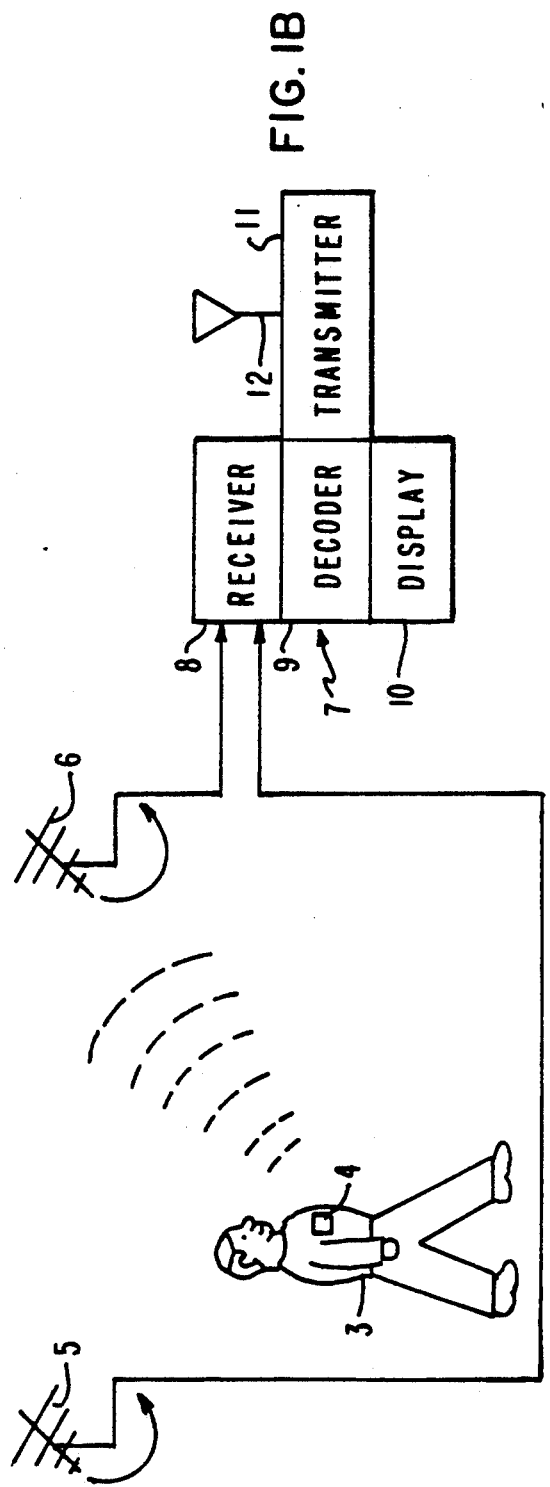

DUAL MODE ELECTRONIC IDENTIFICATION SYSTEM

This application is a continuation of application Ser. No. 07/609,983, filed Nov. 6, 1990, abandoned.

BACKGROUND OF THE INVENTION

This invention relates to an electronic identification system having a tag which is attached to a person or object for identification purposes. The tag can in a first mode when asked to identify by an interrogation signal communicate via radio frequency with fixed locations to identify the tag, such as at portals, for access control to secured areas, and in a second mode the tag can communicate as a beacon with fixed equipment to provide for identification and corresponding position or tracking of the tag.

The protection and tracking of personnel and property in high security areas continues to be a vexing problem. Airports, government facilities, and industrial sites are increasingly concerned with securing large areas for controlled access. Often times the very areas in which it is desired to restrict access also require a large number of authorized occupants to gain legitimate access to work areas. Use of guards and screening devices at entrances needs to be complemented by continuous monitoring of personnel once they are on the premises. The use of television cameras and monitors as a solution to this problem suffers from the limitations of human fatigue and the lack of automation to track and distinguish authorized from unauthorized occupants in a secure area. Advanced technology including concepts using laser and infrared signals to track people or objects moving in secured areas provide some help. The need still exists to distinguish authorized from unauthorized persons or objects. While optical means have been suggested for accomplishing such distinguishing of authority, optical means are limited by line-of-sight operation. In addition to tracking and identification of people or objects in a secured area, it is also desirable to restrict entrance into the secured area to those who have proper identity. Access cards and electronic portal admission devices are known and can provide an initial distinguishing of authorized and unauthorized personnel or objects upon access.

An airport location is typical of the complex needs of a modern security site. Portals into the high security runway and baggage areas can be either manned or provided with optical or electronic identity card readers so as to provide a first line of defense against unauthorized entrance into the larger expanse of the runway and baggage areas. Such single line defense is usually considered inadequate for security purposes, and a further security network will be provided. Infrared, optical, or laser scanning systems can be used to identify persons moving within the wide security area, such as the airfield and baggage areas. Unfortunately in such areas activity of authorized persons cannot be distinguished from the movement of unauthorized persons by such scanning systems. There is a need to identify and distinguish authorized from unauthorized persons in a wide area after admission to the area has been gained through some type of portal security system. If authorized persons can be identified and their positions known, then the positions and locations of the authorized personnel can be removed from the data set of the movement detectors and appropriate security action can be taken with regard to the remaining personnel or objects detected.

Reliable identification is also desired in a warehousing situation where it is desired to identify certain commodities when they enter at a warehouse portal and later to identify the position and identity of commodities in a wide area, such as storage or work areas.

In both the security and commodities identification applications it is desirable that the identification system provide for reliability, low cost, relatively long life of batteries or other power supplies, and small size so as to be convenient in use.

SUMMARY OF THE INVENTION

The invention provides for an identification system using a small identification tag which has both a radio frequency receiver and a radio frequency transmitter associated therewith. The tag operates in two modes that provide for identification of personnel or objects for access control at portals and badge readers, and allows for a wide area mode permitting position tracking of the identification tag. The tag is based on a silicon gate CMOS application-specific integrated-circuit and an eight pin non-volatile RAM chip for memory storage. The use of the non-volatile RAM allows the tag to be batteryless when used for access control through portals or with badge readers. When used in the second mode for a wide area of tracking, a lithium/manganese dioxide battery is provided to supply sufficient power for the transmitter. The non-volatile memory can be depended upon to retain identification and history data while the battery is removed.

In an access mode the tag is used to gain entry or access to a secured area. An interrogation signal used at the portals turns the receiver in the tag on and queries the tag for a proper identification. In this mode the battery supply is not used for transmission of the response signal from the tag. The response signal is transmitted using energy received from the interrogation signal. If the tag is authorized, the response signal during the access interrogation can be used to admit the person or object having the tag and can be recorded in a database so that the system knows the identity of the person or object entering the secured area.

Once in the wide secured area the tag now becomes a radio frequency beacon having transmission powered from its internal battery supply without being queued to respond by an interrogation signal. The beacon signal can provide the identity of the tag and, through use of directional antennas and a position control, the specific location of the authorized identity tag can be known. The location and identity may then be displayed, stored, or used in conjunction with other security systems to provide a more complete informational database. In some applications it may be desirable in the wide area tracking mode to communicate with the tag, and either a separate transmitter or the portal interrogation transmitter can be used to communicate with the tag. To conserve the battery in the wide area tracking mode, the beacon signal is preferably a periodic burst transmission. When the tag leaves the wide security area via a portal the beacon signal is turned off by the portal interrogation signal which also removes the battery supply from operation. The interrogation signal can be broadcast continuously so that the tag will be powered when it is in the portal area without having to resort to using the battery. The interrogation signal may have modulation that is coded into the signal and can be periodically sent to request the tag to identify itself.

BRIEF DESCRIPTION OF THE DRAWINGS

FIG. 1A is a diagrammatic representation of a security system using a tag at an access portal.

FIG. 1B is a diagrammatic representation of a security system using an identification tag as a beacon for position tracking in a wide security area.

DESCRIPTION OF SOME PRESENTLY PREFERRED EMBODIMENTS

Figure 2:
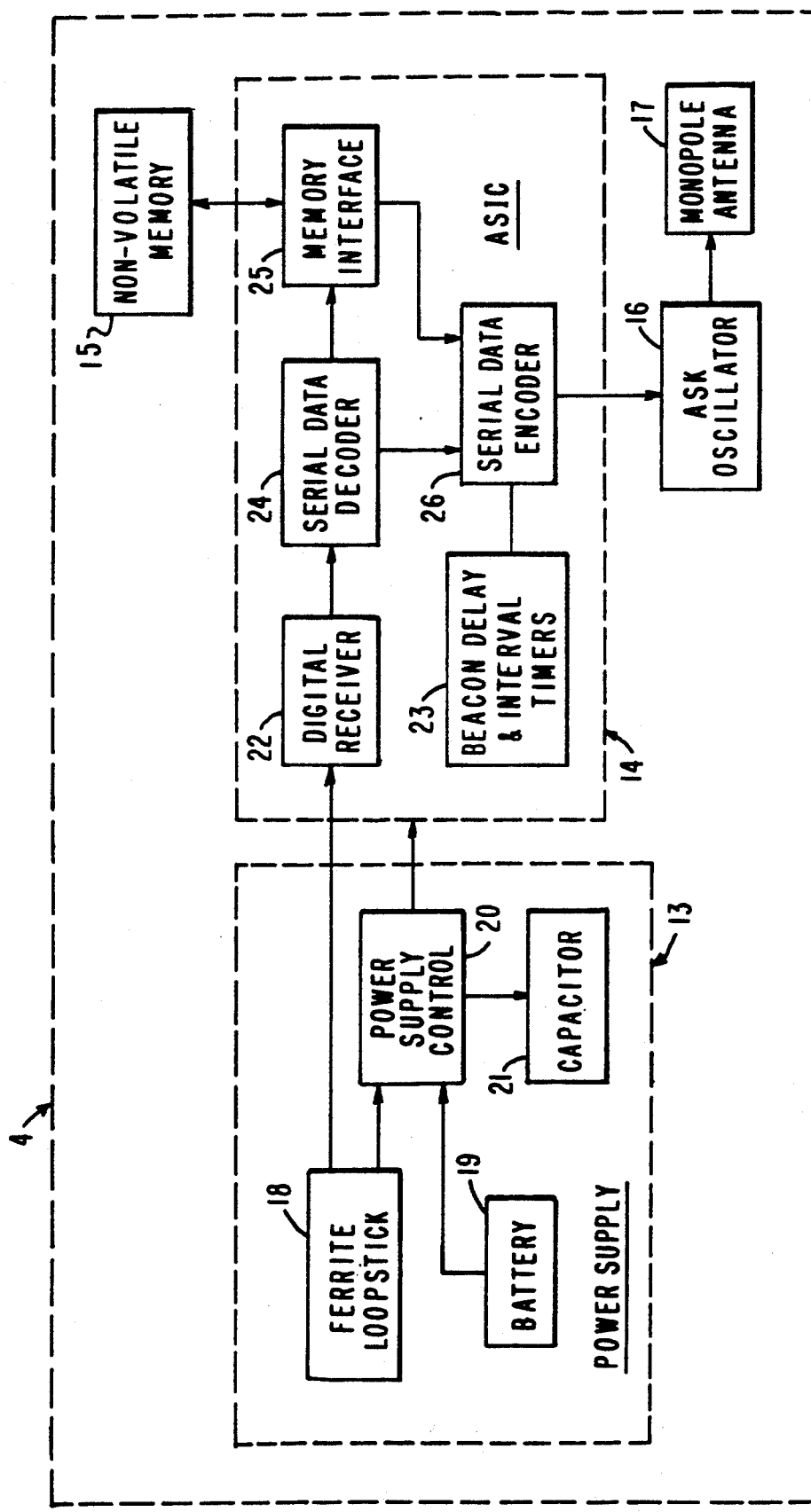
FIG. 2 is a block diagram of a presently preferred embodiment of a dual mode electronic identification tag.

The present invention may be used for a number of applications in which an identification is required at a fixed position as the tag enters a given area and where the identification and location of the tag is desired to be known when the tag is in a much wider varying area.

One presently preferred embodiment of the invention is an application in which the tag is used in a security environment, and the tag is used as a personnel identification device. Other applications could be used in situations where the tag is placed on vehicles, commodities, or containers so that they may be identified as they enter a given area and then tracked in a larger area.

In FIG. 1A a portal, such as a doorway 1, is shown which normally provides an access through a boundary or security line into a wider area. An authorized personnel 3 has in his possession a dual mode identification tag 4. The tag may be in the form of a badge, photo ID, or other visual credentials. The tag incorporates a radio frequency transmitter and receiver as shown in FIG. 2. Upon approaching the portal 1 the tag 4 comes within the signal range of a portal head 2 which emits an interrogation signal which is received by the tag 4. The tag will respond to the interrogation signal by giving coded information to the portal head 2 which will identify it as an authorized tag. The radio frequency transmitted from the tag 4 is received by the portal head 2, and the portal head 2 may use known controls to admit the authorized personnel 3, and, in some applications, it may record the data into a display or data logging system.

FIG. 1B shows the authorized personnel 3 after he has entered the wide security area through a portal. In this mode the tag 4 emits a periodic radio frequency beacon signal which is received by directional antennas 5 and 6. The beacon signal emitted from tag 4 provides an encoded identity information, and the rotational scanning antennas 5 and 6 provide the identity information and the angular position information to a position control 7 which includes a receiver 8 and a decoder 9. The decoder now contains both the information as to the identity of the tag 4 and its relative position from the scanning antennas 5 and 6. This information can be stored or displayed on a display 10 such as a CRT terminal. Also, a transmitter 10 is provided to transmit information, via antenna 12, to the tag 4 when it is recognized, if desired.

The choice of radio frequencies for transmitting and receiving in the tag identification system is important. A low RF frequency such as 150 kHz can be used for the interrogation signal at the portals 1. This low frequency lends itself to simple ferrite loopstick antennas mounted above the portals, such as the head 2. Since metallic door jams may interfere and tag alignment on personnel 3 cannot be guaranteed, a pair of ferrite loopsticks with appropriate phase shifting can be used to provide a more uniform field pattern. The field used will be the near magnetic field, which can be received for both signal energy and power by a miniature ferrite loopstick 18 mounted in the tag. The ferrite loopstick 18 in the tag provides greatly improved efficiency over printed circuit coils that are sometimes used. The advantage of the near magnetic field is that it falls off as the cube of the distance from the loopstick, thereby reducing the potential for interference between consecutive multiple portals.

The low frequency from the portal head transmitter 2 is broadcast continuously so that the tags can be efficiently powered. The modulation can be differential phase shift keyed at 9600 baud so that communications can be completed rapidly. This choice of modulation method is chosen to provide accurate signal demodulation and bit decoding in the tag without the need for crystal controlled references. The low frequency interrogation signal is received at the tag 4 by the ferrite loopstick 18. The loopstick 18 is part of the power supply 13, which also includes a battery, such as a lithium/manganese dioxide battery which is used in the beacon mode. During the access mode the loopstick 18 receives the interrogation signal and provides a signal to the power supply control 20 which charges the capacitor 21 and controls the battery 19 to place it in an off condition.

The tag 4 also includes a silicon gate CMOS application specific integrated circuit 14. The integrated circuit 14 includes a digital receiver 22 which receives signal and power in the first mode from the loopstick 18. During the access mode the loopstick 18 provides power to all devices in the tag including the transmitter. The digital receiver 22 processes the interrogation signal and a serial data decoder 24 extracts the identity information from the interrogation signal. The request to respond prompts the decoder 24 to retrieve its identity information from non-volatile memory 15. The non-volatile memory may be a RAM chip, such as one containing 128 bytes of storage. Such RAM chips are readily available and may easily be used with a memory interface 25 on integrated circuit 14. The memory chip 15 has previously been programmed with an identity number which is transferred via the memory interface 25 and serial encoder 26 upon receipt of an interrogation signal.

The serial data encoder 26 receives the information to be transmitted from the memory interface 25 and the request to respond from the serial data decoder 24. The encoder 26 when cued from an interrogation signal from the portal head 2 keys the identity or authorization data to the amplitude shift keyed oscillator 16 which feeds a monopole antenna 17. The oscillator 16 and antenna 17 form a UHF radio frequency transmitter. This transmitter operates at an ultra-high frequency such as 950 MHz. This frequency lends itself to a simple single transistor oscillator circuit and a quarter-wave monopole antenna which is approximately 3.1 inches in length. These features are very desirable when packaging the tag for personnel use. The response signal from antenna 17 is read by the portal head 2 and the information received from the tag can then be processed.

In the wide area beacon mode the beacon signal from the tag 4 is supplied by the oscillator 16 and antenna 17. In this mode the burst transmissions can be selectively turned on when the tag leaves the portal area and enters the security area. Conversely, the burst mode transmissions can be turned off when entering the building through an entrance portal. The ferrite loopstick 18 when not in range of the low frequency interrogation signal emanating from the portal head 2 cannot supply power to the power control 20 which functions as a diode auctioning device to power the unit from the available electric power source, either the capacitor 21 or the battery 19 or the energy from the loopstick 18 itself. When the stored energy from the interrogation signal is not available, power is supplied from the battery 19 to the integrated circuit 14 and other devices located on the tag 4. In this mode when energy is being supplied from the battery the beacon signals from the tag are not continuous but contained in transmission bursts. The transmitter is used in a burst mode at low duty cycle, for example 0.0025, for the wide area beacon signal mode. Typical operation is a 500 microsecond burst of data 5 times per second. The timer 23 prompts the encoder 26 to key the oscillator 16 in this mode.

In one presently preferred embodiment the timer 23 is a random timer device which reduces the probability of multiple tags transmitting simultaneously and the signals interferring with each other. Timer 23 can have an output of a random frequency between predetermined limits. These limits may vary from a fraction of a second to several hours depending upon the number of tags in the system, and the time needed to recognize and identify the beacon signal. When in the beacon or tracking mode the transmission bursts from tag 4 are sensed by scanning antennas 5 and 6 that can recognize the code bursts. Control 7 is then used to home in on the angular location of the tag. Stepping motors used in conjunction with antennas 5 and 6 can be used to look for the maximum field strength. Antenna rotation scan rates of one rotation per two seconds will encounter up to ten burst per transmission to enable rapid location of tag beacon signals. The coordination of the angular position from two consecutive scanning antennas will yield location of tags along with the identification data related to that tag. At 950 MHz the scanning antennas can be very small, seven element Yagi's are approximately 12 inches in length with approximately 6 inch elements.

The tag 4 uses the same UHF burst transmission for the wide area position beacon mode and for the identity access interrogation mode at portals and badge readers. Normally the beacon transmitter in the tag is turned off when it is in the area of the portal in the unsecured area. It is turned on usually in response to an interrogation signal at a portal and then powered by the loopstick antenna 18 circuit. If it leaves the field of the portal the loopstick 18 power is diminished and the tag 4 is powered by battery 19 and automatically is placed in the beacon mode with interval timer 23 initiating identification data transmissions through the keyed oscillator 16 and antenna 17. This automatic shift in power supply source is an important feature in the power supply management of the tag design. Battery life of 1 to 3 years is anticipated with a 500 mAh lithium cell 19.

This invention provides a single device which can function as an access identification means and as a wide area position location and identification beacon. Simultaneous with the shift in modes is a shift in the respective source of electrical power for the respective mode operation. In one embodiment the interrogation signal emitted by the portal head 2 is coded into a continuous RF signal and the presence of the continuous RF signal causes the battery to be turned off.

In one presently preferred embodiment where the tag is used as an inventory tracking device, the activation of the beacon is controlled by a timer. If the tag's beacon delay timer is set for a given period of time, then it will begin beacon operation at the expiration of that period. When the timer reaches its preset, the tag 4 will generate via the oscillator 16 and antenna 17 a beacon signal that will identify the tag. As with previous embodiments in the beacon mode, this signal is powered by battery 19. In this embodiment timer 23 can have both a random output and a preselected output. When the preselected time period has expired and the tag has not been asked for an inquiry via a signal to loopstick antenna 18, then the serial data encoder 26 sends a desired data transmission to the oscillatory 16. This mode is particularly advantageous in warehousing situations where the tags are associated with goods that may be dated or aged and it is desirable to select the preset time to correspond to the maximum desired dwell time in the warehousing system. If the tag and the goods to which it is attached has not been moved to a portal or inquired to via an interrogation signal for a period equal to this preselected time then the beacon delay of timer 23 would enable beacon operation thereby signalling its presence and identity. By monitoring this beacon mode signal, aged or dated articles in the warehousing system can be quickly identified. In addition since the beacon signal would normally be position trackable, the identity and specific location of "stale" items in the system can readily be self-identified. Timer 23 can include a beacon interval timer for setting the period between transmission bursts, and a delay timer which sets the time period for beginning or initiating the beacon signal.

While certain presently preferred embodiments have been described and shown in the figures, other embodiments of the present invention will be apparent to those skilled in the art.

We claim:

1. A dual mode electronic identification system comprising:

an access transmitter means for providing an RF interrogation signal;

an access receiver means for responding to an identity signal having identifying data encoded therein;

an electronic identification tag having supply means for providing electrical power to said tag, memory means for storing identifying data associated with said tag, RF receiver means cooperable with said supply means for receiving and processing said RF interrogation signal, transmitter means for transmitting the identity signal containing said identifying data associated with said tag in response to a receipt by said receiver means of said RF interrogation signal and for periodically transmitting a beacon signal containing said identifying data associated with said tag in response to a lack of a receipt by said receiver means of said RF interrogation signal, and timer means for allowing transmission of said beacon signal to be initiated only after the elapse of a predetermined time period during which said RF interrogation signal is not perceived by said receiver means;

beacon signal processing means for detecting said beacon signal and determining therefrom the physical position of said tag and for decoding said identifying data associated with said tag; and wherein said predetermined time period is greater than the time intervals between said periodic transmissions of said beacon signal.

2. The dual mode electronic identification system of claim 1 wherein said beacon signal processing means includes at least two direction sensing antennas.

3. The dual mode electronic identification system of claim 1 further comprising means for displaying the physical position and identifying data of said tag.

4. The dual mode electronic identification system of claim 1 wherein said access transmitter broadcasts said interrogation signal continuously and periodically encodes information on said signal requesting said tag to respond.

5. The dual mode electronic identification system of claim 1 further comprising:
RF power transmitter means for providing a RF power signal;
wherein said RF receiver means is capable of receiving said RF power signal and wherein said supply means comprises an electrical storage battery and a first means for supplying power from said RF power signal.

6. The dual mode electronic identification system of claim 5 further comprising:
a power supply control means for utilizing said first means when said RF power signal is present and for utilizing said electrical storage battery when said RF power signal is not present.

7. The dual mode electronic identification system of claim 6 wherein said RF power signal is said RF interrogation signal.

8. The dual mode electronic identification system of claim 1 wherein said timer means allows transmission of said beacon signal with random time delays between predetermined limits.

9. A dual mode electronic identification tag comprising:
supply means for providing electrical power to said tag;
memory means for storing identifying data associated with said tag;
RF receiver means cooperable with said supply means for receiving and processing an RF interrogation signal;
transmitter means for transmitting an identity signal containing said identifying data associated with said tag in response to a receipt by said receiver means of a RF interrogation signal and for periodically transmitting a beacon signal containing said identifying data associated with said tag in response to a lack of a receipt by said receiver means of said RF interrogation signal;
timer means for allowing transmission of said beacon signal to be initiated only after the elapse of a predetermined time period during which said RF interrogation signal is not perceived by said receiver means; and wherein
said predetermined time period is greater than the time intervals between said periodic transmissions of said beacon signal.

10. The dual mode electronic identification tag of claim 9 wherein said
RF receiver means is capable of receiving a RF power signal and wherein said supply means comprises an electrical storage battery and a first means for supplying power from said RF power signal.

11. The dual mode electronic identification tag of claim 10 further comprising a power supply control means for utilizing said first means when said RF power signal is present and for utilizing said electrical storage battery when said RF power signal is not present.

12. The dual mode electronic identification tag of claim 11 wherein said RF power signal is said RF interrogation signal.

13. The dual mode electronic identification tag of claim 12 wherein said receiver means is a digital signal receiver.

14. The dual mode electronic identification tag of claim 13 wherein said transmitter means comprises a UHF oscillator and said identity signal is modulated by amplitude-shift-keying of said oscillator.

15. The dual mode electronic identification tag of claim 9 wherein said is timer mean allows transmission of said beacon signal with random time delays between predetermined limits.

16. The dual mode electronic identification tag of claim 9 wherein said transmitter means comprises a UHF oscillator and said identity signal is modulated by amplitude-shift-keying of said oscillator.

17. An electronic identification tag, comprising:
supply means for providing electrical power to said tag including an electrical storage battery and a first means for supplying power from a RF power signal;
memory means for storing identification data associated with said tag;
RF receiver means cooperable with said supply means for receiving and processing an RF interrogation signal and for receiving said RF power signal;
transmitter means for transmitting an identity signal having said identification data encoded therein in response to a receipt by said RF receiver means of said RF interrogation signal and for periodically transmitting a beacon signal having said identification data encoded therein when said RF receiver means fails to perceive said RF interrogation signal; and
RF responsive means associated with said RF receiver means and said supply means for causing said electrical storage battery to supply power only in the absence of receipt of said RF power signal.

18. The electronic identification tag of claim 17, wherein said RF interrogation signal and said RF power signal are the same.

19. A dual mode electronic identification system comprising:
an access transmitter means for providing an RF interrogation signal and an RF power signal;
an access receiver means for responding to an identity signal having identifying data encoded therein;
an electronic identification tag, comprising supply means for providing electrical power to said tag including an electrical storage battery and a first means for supplying power from said RF power signal, memory means for storing identification data associated with said tag, RF receiver means cooperable with said supply means for receiving and processing said RF interrogation signal and for receiving said RF power signal, transmitter means for transmitting the identity signal having said identification data encoded therein in response to a receipt by said RF receiver means of said RF interrogation signal and for periodically transmitting a beacon signal having said identification data encoded therein when said RF receiver means fails to perceive said RF interrogation signal, and RF responsive means associated with said RF receiver means and said supply means for causing said electrical storage battery to supply power only in the absence of receipt of said RF power signal; and beacon signal processing means for detecting said beacon signal and determining therefrom the physical position of said tag and for decoding said identifying data associated with said tag.

20. The system of claim 19, wherein said RF interrogation signal and said RF power signal are the same.

* * * * *